United States Patent
Means

[11] 3,772,546
[45] Nov. 13, 1973

[54] DYNAMOELECTRIC MACHINE WITH CERAMIC PERMANENT MAGNETS

[75] Inventor: William A. Means, Rockford, Ill.

[73] Assignee: Applied Motors, Inc., Rockford, Ill.

[22] Filed: Feb. 28, 1972

[21] Appl. No.: 229,809

[52] U.S. Cl. .............. 310/154, 310/91, 248/205 A
[51] Int. Cl. ........................................ H02k 21/26
[58] Field of Search .................. 310/154, 254, 258, 310/259, 42, 44, 40 MM, 71, 91, DIG. 4; 248/205 A

[56] References Cited
UNITED STATES PATENTS

| | | | |
|---|---|---|---|
| 3,091,713 | 5/1963 | Latta | 310/258 |
| 3,277,324 | 10/1966 | Beaudoin | 310/254 |
| 3,663,850 | 5/1972 | Phelon | 310/154 |
| 3,631,277 | 12/1971 | Ferdig | 310/154 |
| 3,567,974 | 3/1971 | Spingler | 310/154 |
| 3,521,096 | 7/1970 | Merriam | 310/154 |

OTHER PUBLICATIONS
German Patent Publication; No. 1,924,473; Masjoshusmann; 11, 1970.

Primary Examiner—R. Skudy
Attorney—Wolfe, Hubbard, Leydig, Voit & Osann

[57] ABSTRACT

The effective tensile strength of the ceramic permanent magnets of a DC motor is increased in directions angularly and radially of the motor housing by bonding thin steel strips to the axially facing ends of the magnets, the strips increasing the resistance of the magnets to breakage due to shock forces and bending stresses applied transaxially of the housing and transmitted through the housing to the magnets. In one embodiment, axially projecting flanges integral with the strips are bonded to the housing to anchor the magnets to the housing while reducing breakage of the magnets due to differential thermal expansion between the magnets and the housing. In a second embodiment, the magnets are anchored to the housing by connectors which are bonded to the housing and the axially extending side edges of the magnets to reduce breakage due to differential thermal expansion and to increase the effective tensile strength of the magnets in the axial direction.

10 Claims, 4 Drawing Figures

PATENTED NOV 13 1973 3,772,546

DYNAMOELECTRIC MACHINE WITH CERAMIC PERMANENT MAGNETS

BACKGROUND OF THE INVENTION

This invention relates in general to a dynamoelectric machine and, more particularly, to a dynamoelectric machine in which a rotor is journaled for rotation in a generally cylindrical housing within an internal magnetic field established by permanent magnets made of ceramic magnet material, the magnets being disposed between the housing and the rotor and being anchored to the housing in radially gapped relation with the rotor.

By virtue of their composition, the ceramic magnets have a comparatively low tensile strength and are susceptible to fracturing in tension when the housing is subjected to shock forces applied to the housing either directly or by way of the rotor if the latter should happen to be decelerated suddenly such as by encountering an external obstruction. In addition, heat generated within the housing causes differential thermal expansion between the material of the housing and the material of the magnets and, since the magnets are anchored to the housing, such differential expansion can result in fracturing of the magnets.

SUMMARY OF THE INVENTION

One general aim of the present invention is to reinforce the ceramic magnets and increase their effective tensile strength so as to make the magnets more resistant to breakage due to shock forces and bending stresses than the magnets of prior dynamoelectric machines of the same general type.

A more detailed object of the invention is to achieve the foregoing by cementing reinforcing strips to the ends of the magnets, the reinforcing strips having a higher tensile strength than the ceramic magnet material and serving to increase the resistance of the magnets to fracturing in tension.

A further object is to employ reinforcing strips made of a comparatively high strength magnetic material which is magnetically attracted toward pressing engagement with the magnets to avoid the need of clamping the strips to the magnets during curing of the bonding cement. A related object is to use magnetic strips which are easily saturated by the permanent magnet flux so as to avoid shunting any significant amount of flux in a path which by-passes the effective flux path across the gap between the magnets and the rotor.

Another aim of the invention is to anchor the magnets to the housing in a unique manner which reduces breakage of the magnets resulting from differential thermal expansion between the housing and the magnets.

The invention also resides in the comparatively simple construction of the reinforcing strips and in the use of the same strips to anchor the magnets to the housing.

These and other objects and advantages of the invention will become more apparent from the following detailed description when taken in conjunction with the accompanying drawings.

DETAILED DESCRIPTION OF THE PREFERRED EMBODIMENTS

Figure 1:
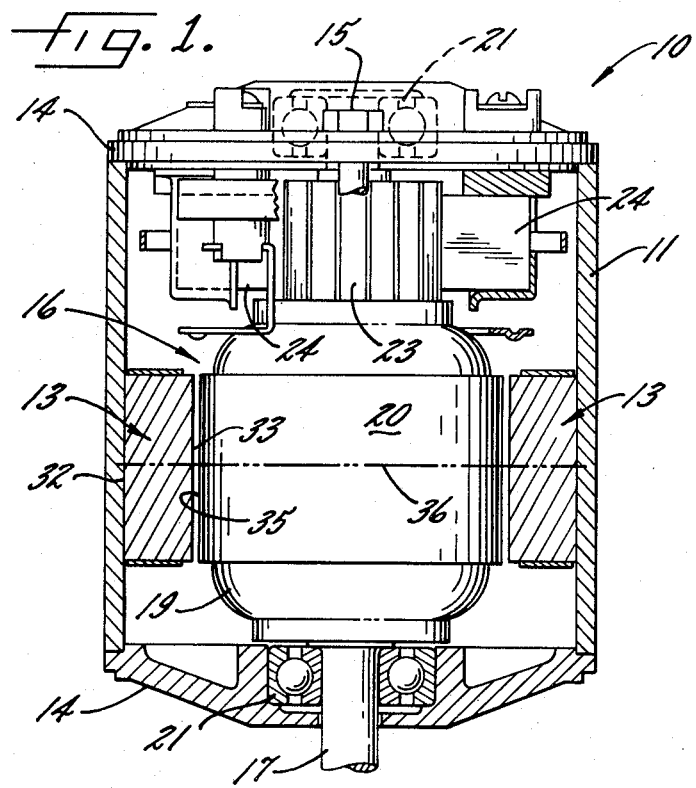
FIG. 1 is a side view of one embodiment of a new and improved dynamoelectric machine incorporating the novel features of the present invention, part of the housing of the machine being broken away and shown in section.

Referring to FIG. 1, there is shown an exemplary dynamoelectric machine in the form of a DC motor 10 having a generally cylindrical steel housing 11 within which is anchored a pair of angularly spaced permanent magnets 13 for establishing the internal magnetic field. Circular-shaped covers 14 (customarily referred to as end bells) close the ends of the housing and are fastened to the housing by axially extending screws 15.

Centered between the magnets is a rotor or armature 16 (FIG. 1) comprising a central shaft 17 rotatable about the axis of the housing 11 and carrying a winding 19 in a slotted, laminated core structure 20 of permeable material. The shaft is journaled adjacent its ends in bearings 21 fixed to the end bells 14 and supports a commutator 23 disposed end-to-end with the core 20 and having individual conductive segments conventionally connected electrically to the winding 19. Two carbon contact brushes 24 extend radially of and are spaced diametrically around the commutator and engage the segments to transfer unidirectional current to the winding from an external power source, thereby to create an electromagnetic field which acts in conjunction with the electromagnetic field developed by the permanent magnets 13 to produce the torque necessary for sustained and continuous running of the motor. The motor 10 as thus described is especially suitable for use in driving small power tools, electric lawnmowers and the like.

Figure 3:
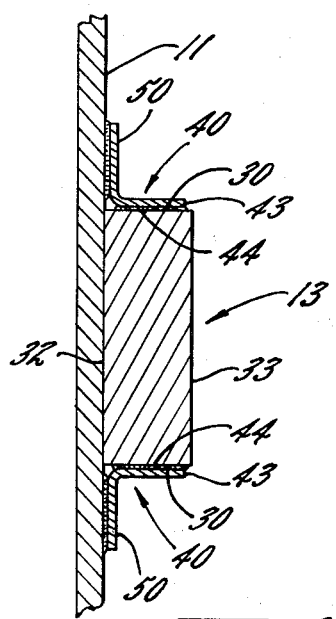
FIG. 3 is a fragmentary cross-section taken substantially along the line 3—3 of FIG. 2.
Figure 2:
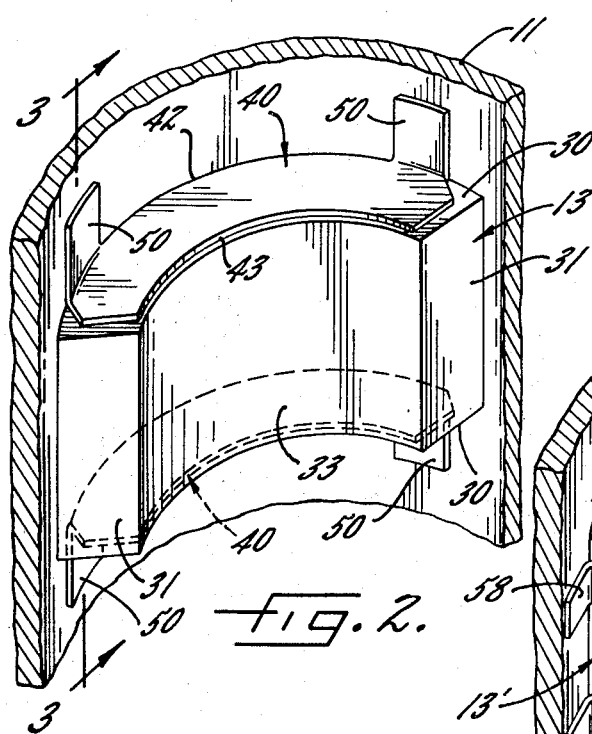
FIG. 2 is a fragmentary perspective view of part of the housing and showing one of the magnets.

The magnets 13 are located diametrically of one another and extend axially along a substantial length of the housing 11. As shown in detail in FIGS. 2 and 3, each magnet includes upper and lower axially facing edges or ends 30, two axailly extending side edges 31, and a convex outer side 32 and a concave inner side 33 concentric with the housing 11 and the rotor 16, respectively. The magnets are anchored to the inner wall of the housing with their outer sides 32 adjacent the wall and with their inner sides 33 spaced radially outwardly from the rotor to define a narrow air gap 35 (FIG. 1) of approximately 0.035 inch between the magnets and the rotor. Each magnet is permanently magnetized in a radial direction and produces lines of flux which develop the internal field upon cutting across the air gap 35 in a path 36 extending from the pole of one magnet through the core 20 and returning to the pole of the other magnet through the steel housing 11.

The magnets 13 preferably are composed of ceramic ferrite material such as barium ferrite and thus are comparatively inexpensive and possess high retentivity and strong coercive force. While the ceramic magnet material is comparatively strong in compression, it is very brittle and is relatively weak in tension, such material having a tensile strength of only about 4,000 psi. As a result, the magnets are susceptible to fracturing when subjected to comparatively severe shock or vibrational forces as might be transmitted to the magnets through the housing 11 by an object striking the housing or as a result of the blade or tool on the shaft 17 encountering an obstruction. In the latter instance, the shaft is abruptly decelerated or stopped, and the force created by striking the obstruction is transmitted to the housing 11 and the magnets 13 through the bearings 21 to subject the magnets to severe shock and possible breakage. In addition, such force sometimes causes slight flexing of the housing to place one part of each magnet in compression and the other part in tension, thereby resulting in fracturing of the magnet because of the low tensile strength of the magnet.

In accordance with one aspect of the present invention, the effective tensile strength of the magnets 13 is increased both radially and angularly of the housing 11 and the tendency for the magnets to break under shock forces and bending stresses applied transaxially of the housing is reduced by reinforcing the ends 30 of the magnets in a novel manner with plates or strips 40 of material having a tensile strength which is significantly greater than that of the ceramic magnet material. Each strip preferably is bonded over substantially the entire surface area of the respective magnet end 30 and thus effectively serves to tie the ceramic magnet particles together to strengthen the magnet in tension.

More specifically, the reinforcing strips 40 used herein are made of metal and are sized and shaped generally in accordance with the size and shape of the ends 30 of the magnets 13. Thus, each strip includes outer and inner edges 42 and 43 which are generally concentric with and formed on the same radius as the outer and inner faces 32 and 33, respectively, of the magnet, the outer edge of the strip also being generally contiguous with the inner wall of the housing 11. Each strip substantially covers the end 30 of the respective magnet and is bonded tightly to the magnet end by a layer 44 (FIG. 3) of cement or glue such as epoxy resin. While in liquid form, the epoxy is coated on the ends of the magnets, the strips then are pressed onto the epoxy layers and, within approximately 24 hours, the epoxy cures or dries fully to anchor the strips securely to the magnets.

In order to establish a good tight bond between the strips 40 and the magnets 13, it is necessary that the strips be pressed against the epoxy layers 44 and toward the ends 30 of the magnets during the time the epoxy is drying. Advantageously, the need for physically clamping or fixturing the strips to the magnets during the drying period is eliminated by making the strips out of magnetic metal. Thus, the magnets themselves magnetically attract the strips into pressing engagement with the epoxy and cause the strips to press the epoxy against the ends 30 of the magnets to effect secure bonding of the strips without the expensive and time-consuming use of clamping fixtures. In this particular instance, the strips are made of steel which not only is magnetically attracted to the magnets but which also is comparatively inexpensive and possesses high tensile strength on the order of 100,000 psi. The steel strips thus are very effective to increase the strength of the magnets in tension.

While the use of the steel strips 40 is advantageous to simplify the bonding procedure, the strips do tend to form magnetic shunts in the field of the magnets 13. To avoid shunting any significant part of the flux from the normal flux path 36 passing across the air gap 35, the steel strips are made very thin and thus become easily magnetically saturated by a very small percentage of the available magnet flux, so that the strips cannot carry more than a small amount of flux in shunt paths which by-pass the air gap. Herein, the strips have a thickness of only about 0.010 inch to 0.020 inch and are easily saturated so as to shunt only about 1 ½ to 3 percent of the total flux otherwise passing in the normal flux path 36 and across the air gap between the magnets and the armature 16.

From the foregoing, it will be apparent that the steel reinforcing strips 40 bonded to the ends 30 of the magnets 13 increase the effective tensile strength of the magnets in the angular and radial directions and thus there is less likelihood of the brittle and comparatively weak magnet material cracking or breaking when shock forces or bending stresses imposed transaxially of the housing 11 are transmitted to the magnets. Moreover, the strips may be bonded to the magnets in a comparatively simple and easy manner and do not significantly detract from the normal effectiveness of the magnets.

Being relatively weak in tension and being anchored to the housing 11, the ceramic material of the magnets 13 is susceptible to breakage when differential thermal expansion occurs between the magnets and the housing as an incident to the generation of heat within the housing. In other of its aspects, the present invention contemplates anchoring the magnets indirectly to the housing to reduce the danger of breakage due to differential thermal by-pass expansion of the magnets and the housing. In the embodiment shown in FIGS. 1 to 3, indirect anchoring of the magnets is achieved by forming the end portions of each reinforcing strip with integral flanges 50 which project axially from the outer edge 42 of the strip. Each flange is arcuately curved in accordance with the curvature of the inner wall of the housing 11 and lies against and is bonded face-to-face with the housing by a layer of epoxy. With the magnets anchored indirectly to the housing by the connectors formed by the strips 40 and flanges 50, the housing is capable of flexing relative to the magnets to a greater degree than is the case when the outer sides 32 of the magnets are bonded directly to the inner wall of the housing and thus there is less likelihood of differential thermal expansion causing breakage of the magnets.

Figure 4:
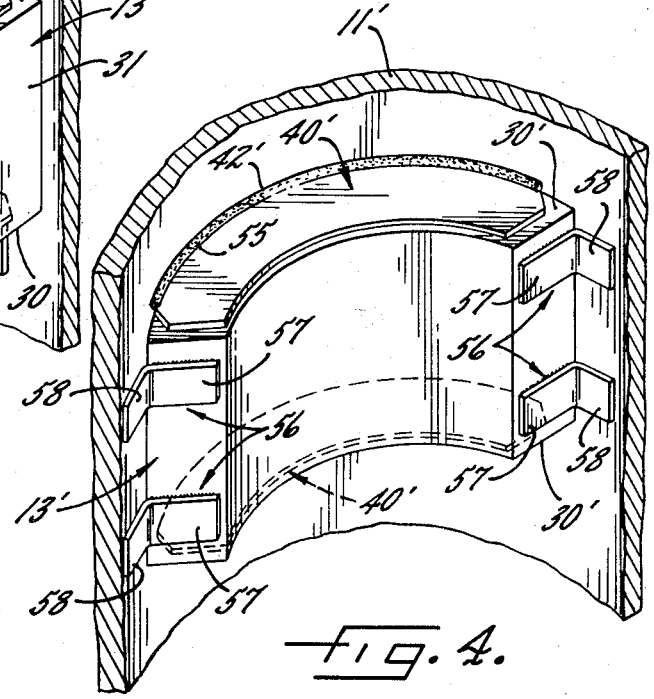
FIG. 4 is a view similar to FIG. 2 but showing another embodiment of the invention.

A further embodiment of the invention is shown in FIG. 4 in which parts corresponding to those of the first embodiment are indicated by the same but primed reference numerals. In this instance, the reinforcing strips 40' bonded to the ends 30' of the magnets 13' are simply flat plates and do not include the axially projecting flanges 50. Instead, the outer edge 42' of each strip is bonded to the housing 11' by a fillet 55 of epoxy located between the exposed face of the strip and the inner wall of the housing. To reduce breakage due to differential thermal expansion, steel connectors 56 located at the side edges 31' of the magnets anchor the latter indirectly to the housing. Herein, there are two axially spaced connectors 56 adjacent each side edge of each magnet and each comprises a flat plate 57 and a generally right angular arcuate flange 58, the plate being bonded by epoxy to the side edge 31' of the magnet and the flange being similarly bonded to the inner wall of the housing 11'. In addition to permitting the housing to flex relative to the magnets upon expanding and contracting, the connectors 56 increase the effective tensile strength of the magnets in an axial direction and reduce the likelihood of the magnets breaking as a result of shock loads applied axially to the housing.

While the invention has been shown and described in some detail with reference to particular embodiments thereof, there is no intention that it thus be limited to such detail. To the contrary, it is intended here to cover all modifications, alternatives and equivalents falling within the spirit and scope of the invention as expressed in the appended claims.

I claim as my invention:

1. A dynamoelectric machine comprising a housing of generally circular cross-section, a rotor coaxial with and journaled for rotation within said housing, and at least two angularly spaced permanent magnets of ceramic magnet material disposed between said housing and said rotor and anchored to said housing in radially gapped relation with said rotor, each of said magnets having two axially facing ends and having a convex outer side and a concave inner side substantially concentric with said housing and said rotor, respectively, the improvement in said dynamoelectric machine comprising, reinforcing strips made of a material having a higher tensile strength than said ceramic magnet material and disposed face-to-face with the axially facing ends of said magnets, and means bonding said strips in rigid face-to-face relation with the axially facing ends of said magnets to increase the resistance of the latter to fracturing in tension due to shock forces and bending stresses transmitted transaxially through the housing to the magnets.

2. A dynamoelectric machine as defined in claim 1 in which said strips are made of metal, said bonding means comprising a layer of cement located between the strips and the ends of the magnets.

3. A dynamoelectric machine as defined in claim 2 in which said strips are made of magnetic metal and are magnetically attracted toward engagement with the ends of said magnets so as to press against the latter during curing of said cement.

4. A dynamoelectric machine as defined in claim 3 in which said strips are made of thin gage steel with a thickness not greater than 0.020 of an inch and are magnetically saturated by the permanent magnet flux to avoid shunting more than three percent of the total flux otherwise passing across the gap between said magnets and said rotor.

5. A dynamoelectric machine as defined in claim 2 in which each strip is formed with an arcuate outer edge generally concentric with and formed on substantially the same radius as said housing.

6. A dynamoelectric machine as defined in claim 5 in which a fillet of said cement is located between said housing and the outer edge of each strip to bond the latter to the housing.

7. A dynamoelectric machine as defined in claim 5 further including a flange projecting axially from the outer edge of each strip, said flanges being bonded to said housing to anchor the magnets to the housing and constituting the only physical connections between the magnets and the housing.

8. A dynamoelectric machine as defined in claim 1 in which each of said magnets includes two axially extending side edges and is substantially free of cement on its outer side, and a connector of magnetic material between said housing and each of said side edges and having a plate cemented to said side edge and having a generally right angular flange cemented to said housing to anchor the magnet to the housing.

9. A dynamoelectric machine comprising a housing of generally circular cross-section, a rotor coaxial with and journaled for rotation within said housing, and at least two angularly spaced permanent magnets of ceramic magnet material disposed between said housing and said rotor and anchored to said housing in radially gapped relation with said rotor, each of said magnets having two axially facing ends and having a convex outer side and a concave inner side substantially concentric with said housing and said rotor, respectively, the improvement in said dynamoelectric machine comprising, a layer of cement on each axially facing end of each magnet, and reinforcing strips made of comparatively thin gage steel and bonded by said cement in rigid face-to-face relation with the axially facing ends of said magnets to increase the resistance of the latter to fracturing in tension due to bending stresses and shock loads transmitted transaxially through the housing to the magnets.

10. A dynamoelectric machine comprising a housing of generally circular cross-section, a rotor coaxial with and journaled for rotation within said housing, and at least two angularly spaced permanent magnets of ceramic magnet material disposed between said housing and said rotor and anchored to said housing in radially gapped relation with said rotor, each of said magnets having two axially facing end edges, having two axially extending side edges, and having a convex outer side and a concave inner side substantially concentric with said housing and said rotor, respectively, the improvement in said dynamoelectric machine comprising, connectors between said housing and the axially facing end edges of each magnet, each connector having a plate and having a generally right angular flange, means for cementing said plate and said flange to the associated axially facing end edge and to said housing, respectively, said connectors being made of a material having a higher tensile strength than said ceramic magnet material so as to increase the effective tensile strength of the magnets in directions radially and angularly of said housing.

* * * * *